(12) United States Patent
Maruo et al.

(10) Patent No.: US 7,749,926 B2
(45) Date of Patent: Jul. 6, 2010

(54) WET TYPE FRICTION MEMBER

(75) Inventors: Kenji Maruo, Shizuoka (JP); Xiaoming Gu, Shizuoka (JP)

(73) Assignee: NSK-Warner Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/140,461

(22) Filed: Jun. 17, 2008

(65) Prior Publication Data

US 2008/0254697 A1    Oct. 16, 2008

Related U.S. Application Data

(62) Division of application No. 10/964,821, filed on Oct. 15, 2004, now abandoned.

(30) Foreign Application Priority Data

Oct. 15, 2003    (JP) ............... 2003-354505

(51) Int. Cl.
*D04H 5/00*    (2006.01)
(52) U.S. Cl. .................... 442/327; 428/297.4
(58) Field of Classification Search ............ 428/297.4, 428/300.7; 442/101, 327
See application file for complete search history.

(56) References Cited

U.S. PATENT DOCUMENTS

| 5,209,965 A | 5/1993 | Caldwell |
| 5,707,905 A | 1/1998 | Lam et al. |
| 2003/0031880 A1 | 2/2003 | Aiba et al. |
| 2003/0166825 A1 | 9/2003 | Aiba et al. |
| 2004/0033341 A1 | 2/2004 | Lam et al. |
| 2006/0019080 A1 | 1/2006 | Lam et al. |
| 2006/0019085 A1 | 1/2006 | Lam et al. |

FOREIGN PATENT DOCUMENTS

| EP | 0 147 508 A1 | 7/1985 |
| JP | 57-76317 A | 5/1982 |
| JP | 63-056534 A | 3/1988 |
| JP | 11-200218 A | 7/1999 |
| JP | 2002-80824 A | 3/2002 |
| JP | 2002-363542 A | 12/2002 |
| JP | 2003-025215 A | 1/2003 |
| JP | 2003-183341 A | 7/2003 |
| JP | 2003-268662 A | 9/2003 |

OTHER PUBLICATIONS

Japanese Office Action dated Jun. 16, 2009.
Japanese Office Action dated Feb. 24, 2010 in Japanese Application No. 2003-354505.

*Primary Examiner*—Arti Singh-Pandey
(74) *Attorney, Agent, or Firm*—Sughrue Mion, PLLC

(57) ABSTRACT

A friction plate 22 is formed by pasting a friction member 25 to a core plate 23 of a metal. Numeral 24 designates a spline teeth fitted to a torque transmitting member. The friction member has a nonwoven cloth including aramide fiber and at least one of carbon fiber, carbonized fiber, cellulose fiber and rayon. A thermo-hardening resin includes a friction conditioner, and is impregnated to the friction member. Further, a distribution rate of the friction conditioner is made to be high at a friction surface and is gradually lowered toward a bottom surface. Further, in manufacturing the wet type friction member, a roll, an ultrasonic wave transmitter, a vacuuming apparatus on the like is used.

9 Claims, 3 Drawing Sheets

WET TYPE FRICTION MEMBER

CROSS-REFERENCE TO RELATED PATENT APPLICATION

This is a divisional of U.S. application Ser. No. 10/964,821, filed Oct. 15, 2004, which claims priority from Japanese Patent Application No. 2003-354505, filed Oct. 15, 2003. The entire disclosures of the prior applications are incorporated herein by reference in their entirety.

BACKGROUND OF THE INVENTION

1. Field of the Invention

The present invention relates to a wet type friction member which is used in a wet type multiplate clutch, a single plate clutch of a wet type friction brake, a synchronizer ring, a lock up clutch or the like for a vehicle and an industrial or construction vehicle or the like and a manufacturing method for the same.

2. Description of the Related Art

FIG. 1 is a sectional view showing a basic constitution of a wet type multiplate clutch 10 using a wet type friction member. Numeral 1 designates a clutch case. Numeral 11 designates a spline groove. Numeral 21 designates a separator plate spline-engaged with the spline groove 11. Numeral 22 designates a friction plate. Numeral 3 designates a press plate. Numeral 5 designates a stop ring and the friction plate 22 is spline-engaged with a hub (not illustrated) which corresponds a counter member of transmitting rotation from the clutch case 1. A transmitting member 2 is formed by the separator plate 21, the friction plate 22, the press plate 3 and the like.

Numeral 4 designates a piston. In fastening the clutch, when pressurized oil is introduced from a pressurized oil hole 61 to a hydraulic operating chamber 6, a rotational force is transmitted by pressing the piston 4 in a right direction and pressing the transmitting member 2 to the stop ring 5. In releasing the clutch, when the pressurized oil is drawn from the hydraulic operating chamber 6, the piston 4 returns in a left direction by a return spring 7. At this occasion, the oil is brought into a canceller 8 from an oil hole 81 to strengthen to return the piston 4 by a centrifugal force thereof.

FIG. 2 is a front view taking out to show the friction plate 22, and a friction member 25 is pasted to a core plate portion 23 of a metal. Numeral 24 designates spline teeth provided at an inner periphery of the core plate.

As a wet type friction member, in a conventional, a so-called paper friction member in which paper is used as a base material has mainly been used. The paper friction member is fabricated by blending various friction conditioners to pulp, making paper from the pulp, and impregnating and curing a binding resin such as phenol resin or the like. Up to a current state, the conventional paper friction member can be regarded to show excellent functions to substantially meet requests of heat resistance, μ-V characteristic, wear resistance between layers and the like. Further, notation μ, mentioned above, designates a friction coefficient, and notation V designates a speed of sliding with a counter member. As the μ-V characteristic, it is regarded to be preferable to provide a positive gradient property in which in accordance with an increase in V, also μ is increased.

Although the conventional paper friction member provides with considerably excellent functions, however under a current condition of increasing a load on the wet type friction member by increasing an output of an engine of a vehicle, it becomes difficult to simultaneously ensure functions to be satisfied of the heat resistance, the μ-V characteristic, the wear resistance between layers and the like.

The paper friction member is formed with pores by intertwining fiber. Although, when the porosity is increased, the heat resistance is improved, however the wear resistance between layers (shear strength) is decreased. Conversely, although when the porosity is decreased, the wear resistance between layers is increased, the heat resistance is deteriorated. The both are brought into a trade off relationship. In this way, a change in an environment of use cannot be dealt with by the paper friction member.

SUMMARY OF THE INVENTION

An object of the present invention is to solve the above-described object, and provide a wet type friction member which is a wet type friction member constituted by nonwoven cloth including aramide resin, wherein the nonwoven cloth has at least one of carbon fiber, carbonized fiber, cellulose and rayon, and a thermo-hardening resin including a friction conditioner is impregnated into the nonwoven cloth and a manufacturing method for the same.

DETAILED DESCRIPTION OF THE PREFERRED EMBODIMENTS

The nonwoven cloth can use a fiber longer than that used in a paper friction member. Further, orientation of respective fibers becomes random and therefore, after ensuring porosity, also shear strength is excellent. Furthermore, in order to promote the heat resistance, the nonwoven cloth is based on aramide fiber. Also, the friction member is impregnated with the thermo-hardening resin including the friction conditioner and therefore, three properties of the μ-V characteristic, the wear resistance between layers (shear strength) and the heat resistance can simultaneously be promoted. Further, along with cooling performance of the nonwoven cloth itself, a wear resistance to a counter member is also promoted.

Further, the distribution rate of the friction conditioner is made to be high at the friction surface and is gradually lowered toward the bottom surface and therefore, also the heat resistance is promoted by sufficiently ensuring pores and an effect of using the nonwoven cloth can further be promoted.

The present invention is a wet type friction member constituted by impregnating a thermo-hardening resin including a friction conditioner to nonwoven cloth including one kind or more of other fibers based on aramide fiber and a manufacturing method for the same. Further, the friction conditioner is included by a large amount at a friction surface of the friction member and the amount is reduced gradually toward a bottom surface.

Embodiment 1

A wet type friction member of the present invention is constituted by nonwoven cloth based on 20 through 80% of aramide fiber and comprising at least one of 0 through 50 weight % of carbon fiber, 0 through 50 weight % of carbonized fiber, 0 through 50 weight % of cellulose fiber and 0 through 50% of rayon and the like (aramide fiber is necessarily included and therefore, two kinds of more of fibers when aramide fiber is added), with regard to the nonwoven cloth, the friction member is impregnated with a thermo-hardening resin of 30 through 100 weight % relative to a weight of the nonwoven cloth and a friction conditioner of 1 through 15 weight % relative to the thermo-hardening resin, further, the porosity is set to 35 through 65%.

Further, although the carbon fiber is constituted only by carbon, the carbonized fiber indicates to include a compound of carbon.

As the thermo-hardening resin, phenol resin, denatured phenol resin reformed by oil, rubber, epoxy resin or the like, melanin resin, epoxy resin, polyimide resin, unsaturated polyester resin or the like is conceived. Also, as the friction conditioner, an inorganic powder-like substance of diatom earth, graphite, activated carbon, molybdenum disulphide, silica powder or the like and an organic powder-like substance of cashew dust, fluorine resin powder, spherical phenol resin cured powder or the like is adaptable.

Figure 1:
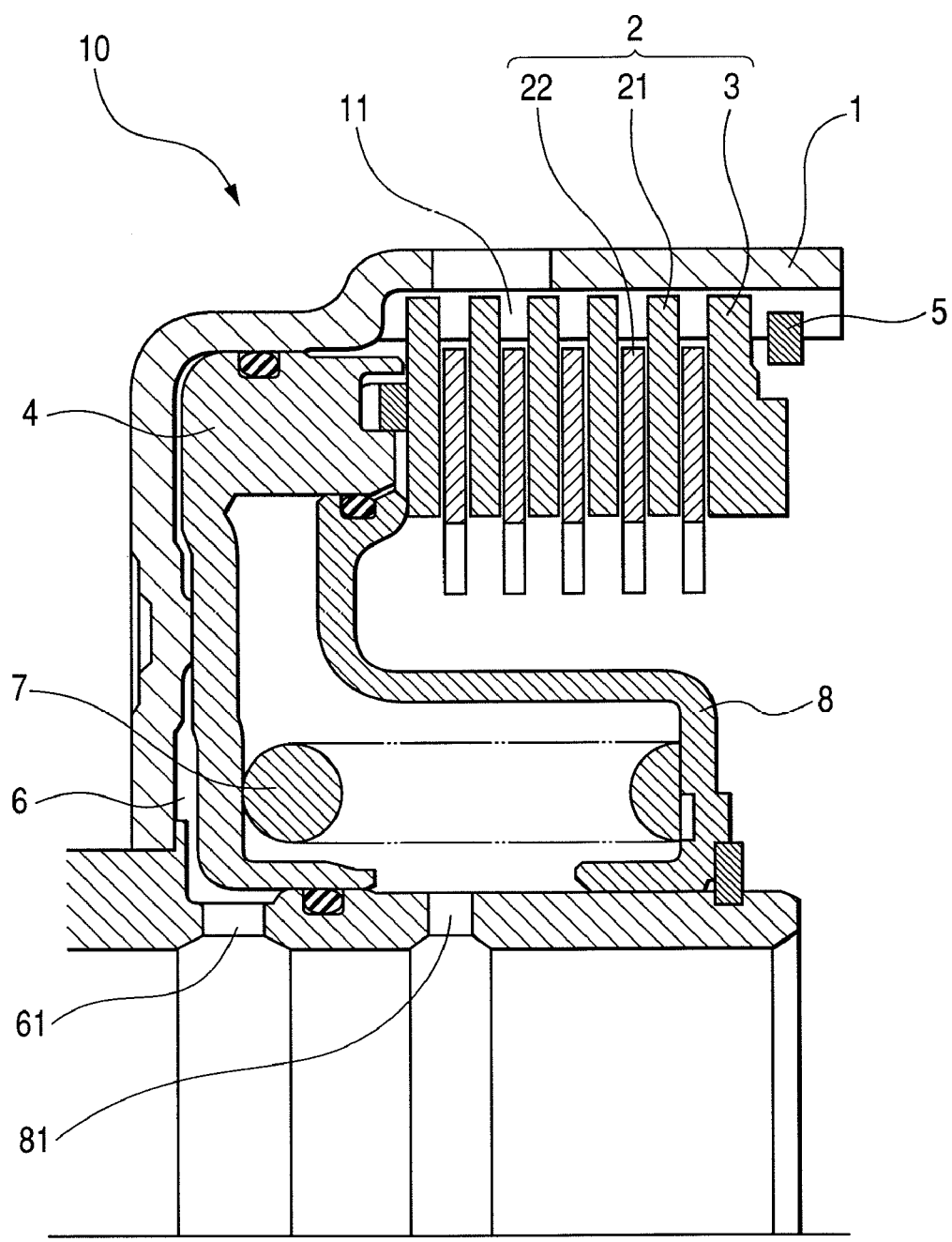
FIG. 1 is a sectional view showing a constitution of a wet type multiplate clutch.
Figure 2:
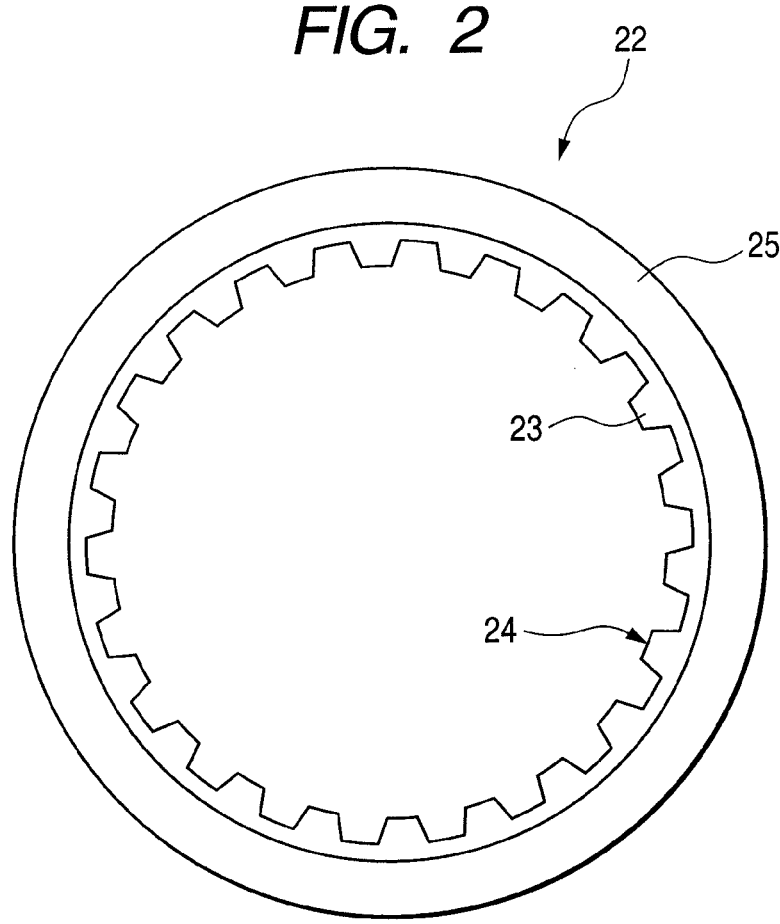
FIG. 2 is a front view of a friction plate.
Figure 3:
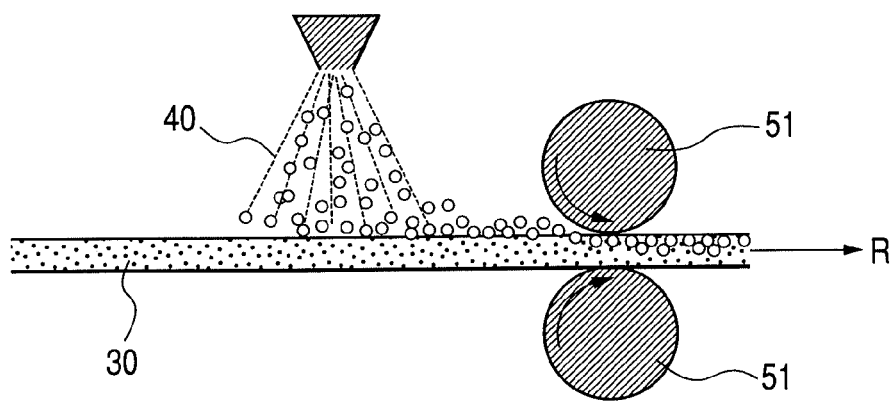
FIG. 3 is a view showing an embodiment of a method for impregnating a thermo-hardening resin including a friction conditioner into nonwoven cloth.
Figure 4:
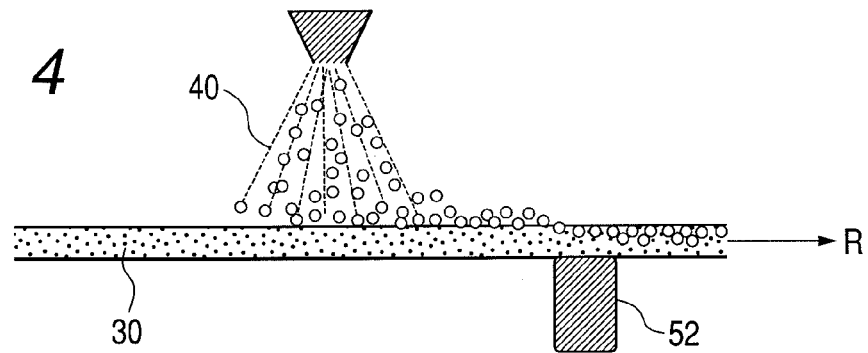
FIG. 4 is a view showing other embodiment similar to FIG. 3.
Figure 5:
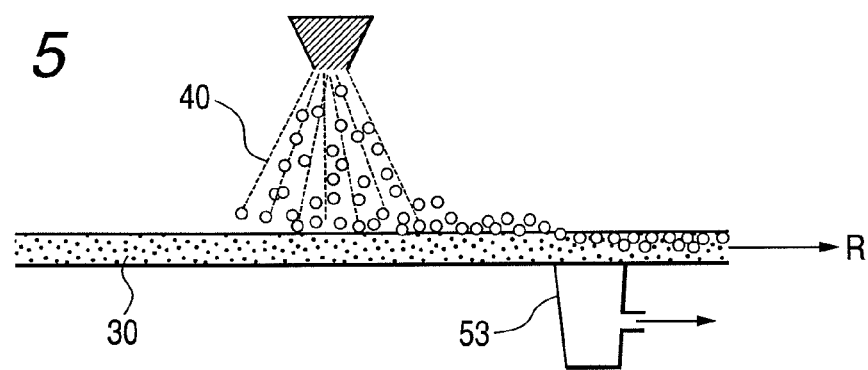
FIG. 5 is a view showing still other embodiment similar to FIG. 4.

Although various methods of impregnating the thermo-hardening resin including the friction conditioner to the nonwoven cloth are conceivable, three kinds of the methods are shown as embodiments in FIG. 3 through FIG. 5.

According to the method shown in FIG. 3, a thermo-hardening resin 40 including a friction conditioner is supplied onto the nonwoven cloth 30 to pass between rolls 51, 51 and the thermo-hardening resin 40 including the friction conditioner is impregnated into the nonwoven cloth 30 by pressing the thermo-hardening resin 40. An arrow mark R indicates a direction of advancing the nonwoven cloth.

The method shown in FIG. 4 is provided with an ultrasonic wave transmitter 52 and the thermo-hardening resin 40 including the friction conditioner is impregnated into the nonwoven cloth 30 by ultrasonic vibration.

The method shown in FIG. 5 is installed with a vacuuming apparatus 53 on a lower side of the nonwoven cloth 30 and the thermo-hardening resin 40 is impregnated into the nonwoven cloth by sucking the thermo-hardening resin 40 including the friction conditioner from a lower side.

Figure 6:
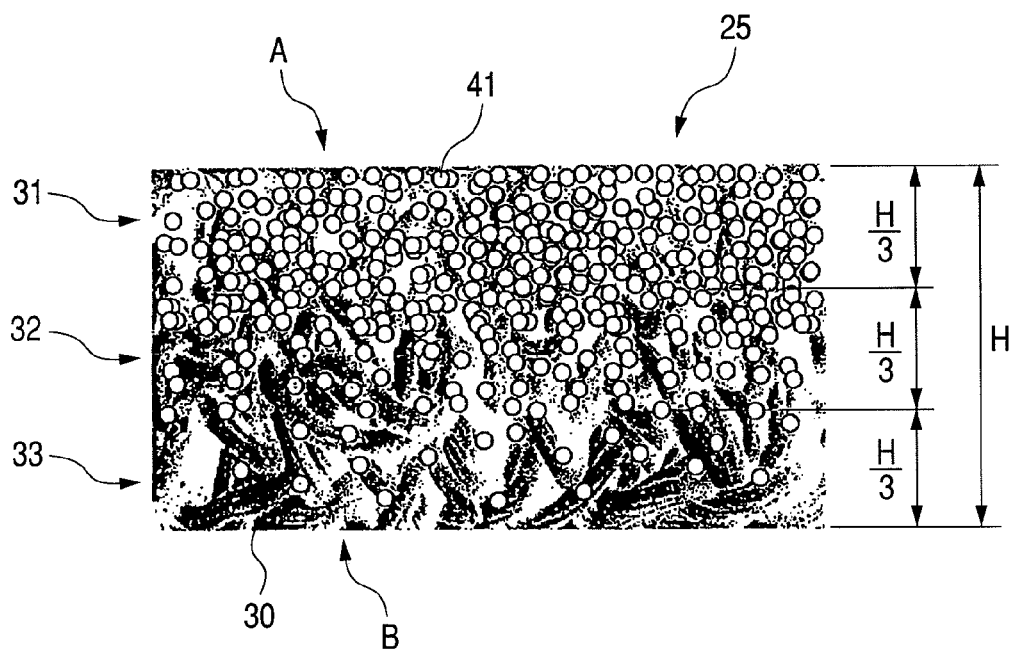
FIG. 6 is an image view showing a situation of distributing a friction conditioner at inside of nonwoven cloth.

FIG. 6 shows an image of a distribution of the friction conditioner in the nonwoven cloth 30. Notation A designates a friction surface side of the friction member 25. Notation B designates a bottom surface side on a side opposed thereto (side adhered to the core plate). Numeral 41 designates a friction conditioner included in the friction member (i.e., in the nonwoven cloth). A thickness of the friction member is designated by notation H, and a surface layer 31, a middle layer 32, and a bottom layer 33 are defined by depths of thirds of the thickness H.

Although the thermo-hardening resin is uniformly impregnated in nonwoven cloth, since the thermo-hardening resin including the friction conditioner is impregnated, a large amount of the friction conditioner stays at the surface layer and is not considerably brought into the bottom layer. Such a property is utilized for the present invention.

The surface layer includes 50 through 80 weight % of the friction conditioner, the middle layer includes 20 through 50 weight % thereof, and the bottom layer includes 0 through 20 weight % thereof. By constituting in this way, the μ-V characteristic between the friction coefficient μ and the sliding speed V is improved to particularly achieve the positive gradient property in which when V is increased and also μ is increased. When the μ-V characteristic is of the positive gradient property, there is achieved an effect that judder is not brought about.

A large amount of the friction conditioner is blended at the portion of the surface layer 31 so as to achieve a sufficient friction force and obtain the positive gradient property of the μ-V characteristic. Further, a small amount of the friction conditioner is blended at the bottom layer 33 to promote heat resistance by sufficiently ensuring pores.

What is claimed is:

1. A wet friction member comprising:
  a nonwoven cloth essentially consisting of aramide fiber and at least one of carbon fiber, carbonized fiber, cellulose fiber and rayon; and
  a thermo hardening resin;
  a powder friction conditioner essentially consisting of at least one of diatom earth, graphite, activated carbon, silica powder and cashew dust, wherein
  the powder friction conditioner is dispersed into the nonwoven cloth by applying the thermo-hardening resin in a liquid state including the powder friction conditioner dispersed therein onto the nonwoven cloth,
  a distribution rate of the powder friction conditioner is high at a friction surface of the friction member and gradually becomes lower toward a bottom surface thereof, and
  a porosity of the wet friction member is 35 to 65%,
  wherein
  when the wet friction member is divided into a friction surface side layer, an intermediate layer and a bottom surface side layer in a thickness direction,
  the distribution rate of the powder friction conditioner at the friction surface side layer is ranging from 50 to 80 wt %,
  the distribution rate of the powder friction conditioner at the intermediate layer is ranging from 20 to 50 wt %, and
  the distribution rate of the powder friction conditioner at the bottom surface side layer is ranging from 0 to 20 wt %.

2. The wet friction member as set forth in claim 1, wherein the thermo hardening resin essentially consists of phenol resin.

3. The wet friction member as set forth in claim 1, wherein the thermo hardening resin essentially consists of denature phenol resin reformed by oil.

4. The wet friction member as set forth in claim 1, wherein the thermo hardening resin essentially consists of polyimide resin.

5. The wet friction member as set forth in claim 1, wherein the thermo hardening resin essentially consists of phenol resin and denature phenol resin reformed by oil.

6. The wet friction member as set forth in claim 1, wherein the thermo hardening resin essentially consists of phenol resin and polyimide resin.

7. The wet friction member as set forth in claim 1, wherein the thermo hardening resin essentially consists of denature phenol resin reformed by oil and polyimide resin.

8. The wet friction member as set forth in claim 1, wherein the thermo hardening resin essentially consists of phenol resin, denature phenol resin reformed by oil and polyimide resin.

9. The wet friction member as set forth in claim 1, wherein an amount of the powder friction conditioner is 1 to 15 wt % relative to that of the thermo-hardening resin.

* * * * *